United States Patent [19]

Adachi

[11] Patent Number: 4,995,360
[45] Date of Patent: Feb. 26, 1991

[54] COMBUSTION CHAMBER

[75] Inventor: Toshiaki Adachi, Fujisawa, Japan

[73] Assignee: Isuzu Motors Limited, Tokyo, Japan

[21] Appl. No.: 394,456

[22] Filed: Aug. 16, 1989

[30] Foreign Application Priority Data

Aug. 31, 1988 [JP] Japan .................. 63-214824

[51] Int. Cl.⁵ ............................................ F02B 19/00
[52] U.S. Cl. ...................................... 123/262; 123/263
[58] Field of Search ............... 123/262, 263, 268, 285

[56] References Cited

U.S. PATENT DOCUMENTS

| 2,118,341 | 5/1938 | Colell | 123/263 |
| 4,237,845 | 12/1980 | Kato et al. | 123/263 |
| 4,395,983 | 8/1983 | Hamai et al. | 123/262 |
| 4,483,289 | 11/1984 | Paul et al. | 123/263 |
| 4,612,888 | 9/1986 | Ishida et al. | 123/263 |
| 4,676,209 | 6/1987 | Etoh et al. | 123/262 |

Primary Examiner—Andrew M. Dolinar
Assistant Examiner—M. Macy
Attorney, Agent, or Firm—Dykema Gossett

[57] ABSTRACT

A swirl chamber is defined by an approximately spherical cavity formed in a cylinder head of an internal combustion engine with the radius of the swirl chamber being reduced in the direction the swirl flows in the swirl chamber. Therefore, the swirl is accelerated as it flows in the swirl chamber. The swirl chamber communicates with a main combustion chamber formed in a piston top via a passage formed in the cylinder head when the piston is at top dead center, and air in the main combustion chamber is forced into the swirl chamber due to the compression stroke of the piston. The passage is formed in a manner such that it has constant transverse section lengthwise and such that a part of the passage defines a tangential line of the swirl chamber. Therefore, the air forced into the swirl chamber passes through the passage with little friction loss, smoothly enters the swirl chamber and gains velocity in the swirl chamber.

20 Claims, 2 Drawing Sheets

COMBUSTION CHAMBER

BACKGROUND OF THE INVENTION

1. Technical Field

The present invention relates to a combustion chamber of an internal combustion engine of the type having two combustion chambers, i.e., a main and auxiliary combustion chamber, and more particularly to an auxiliary combustion chamber or a so-called swirl chamber in which a swirl is generated and primary combustion takes place.

2. Background Art

Many diesel engines have main and auxiliary combustion chambers, and in some of such engines the auxiliary combustion chamber is a swirl chamber. In a diesel engine having a main combustion chamber and a swirl chamber, the intake air is pushed into the swirl chamber at the compression stroke of the engine, and fuel sprayed from a nozzle is mixed with air swirling in the swirl chamber and then a precombustion or primary combustion takes place therein.

Referring to FIG. 4 of the accompanying drawings, the main combustion chamber 2 is defined by a recess formed in the piston 1 top and the swirl chamber 4 is defined by a cavity formed in the cylinder head 3. The swirl chamber 4 communicates with the main combustion chamber 2 via a passage 6 formed in the cylinder head 4 when the piston 1 is at or near top dead center. A part of the passage 6 defines a tangential line of the wall defining the swirl chamber 4. During the compression stroke of the piston, the intake valve 7 is closed and the air sucked in the main combustion chamber 2 is forced into the swirl chamber 4, whereby a swirl of certain strength occurs in the swirl chamber 4. During the combustion process, fuel supplied from the nozzle 8 is ignited by a glow plug 9 or self-ignited (primary combustion) in the swirl chamber 4, and then the combustion gas therein proceeds to the main combustion chamber 2 via the passage 6 whereby a secondary combustion takes place in the main chamber 2.

The air utilization factor in the swirl chamber 4 becomes better as the swirl flows faster. Therefore, better combustion can be expected as the swirl speed becomes higher. In this aspect, attention in the past had primarily focused on the passage 6 between the main and auxiliary combustion chambers. Typical modifications are: (1) to throttle the passage 6 to a certain extent and (2) to change the direction of extension of the passage 6. In either case, however, friction loss is inevitable since the air 6 is throttled through the passage 6 in the former case, and the air does not rotate in the swirl chamber 4 smoothly in the latter case. Such friction loss results in deceleration of the swirl, which in turn results in poorer combustion.

SUMMARY OF THE INVENTION

One object of the present invention is to provide an improved swirl chamber which communicates with a conventional main combustion chamber via the conventional passage but allows the air flowing into the swirl chamber to flow at a speed higher than in the conventional swirl chamber. Better primary combustion can be expected as the swirl flows faster, and better primary combustion leads to improved output performance and fuel consumption rate.

To attain the object mentioned above, there is provided a swirl chamber which is approximately spherical in shape but the radius of the swirl chamber, i.e., the distance from the swirl chamber center to the wall defining the swirl chamber is gradually reduced in the direction the air flows in the swirl chamber. Like a conventional combustion chamber arrangement, the swirl chamber is formed in the cylinder head and is connected with the main combustion chamber formed in the top of the piston via the passage formed in the cylinder head when the piston is at top dead center. In other words, the main combustion chamber and the passage are very similar to the conventional ones, i.e., those illustrated in FIG. 4. The air in the main combustion chamber is forced to the passage leading to the swirling chamber at the compression stroke of the piston, but there is little friction loss through the passage since the passage is not throttled. The air smoothly leaves the passage and reaches the swirl chamber since the passage defines the tangential line of the wall defining the swirl chamber. The air which has entered the swirl chamber is then accelerated as it flows along the swirl chamber wall since the substantial swirl passage in the swirl chamber is throttled or reduced in transverse section. The swirl becomes stronger as it gains speed, and better primary combustion therefore takes place.

DESCRIPTION OF THE PREFERRED EMBODIMENTS

A preferred embodiment of the present invention will be now explained in connection with the attached diagrams.

Figure 1:
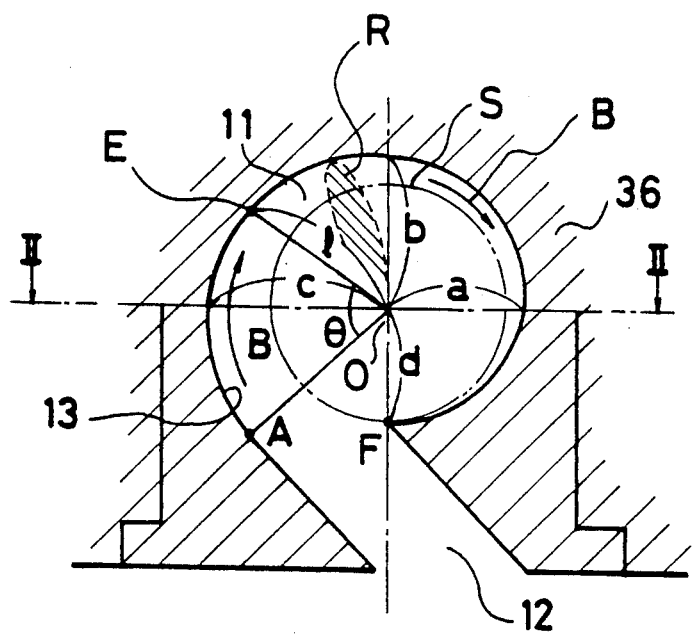
FIG. 1 is a sectional view showing a swirl chamber of an internal combustion engine according to the present invention.
Figure 4:
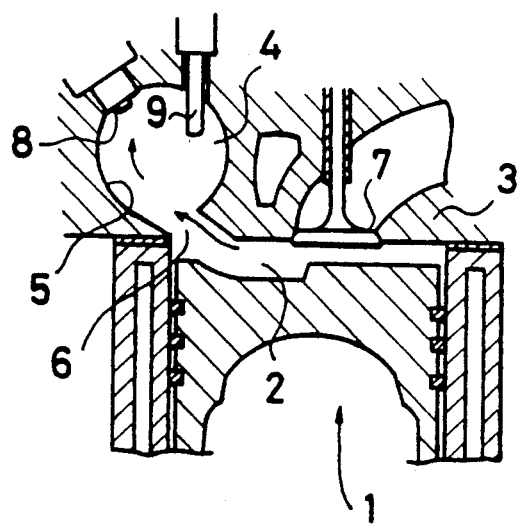
FIG. 4 is a sectional view showing a prior art combustion chamber arrangement.

Referring to FIG. 1, the swirl of auxiliary combustion chamber 11 is formed in the cylinder head 36 and has an approximately spherical shape. Like the conventional combustion arrangement, the auxiliary combustion chamber 11 communicates with the main combustion chamber (not shown, but identical to that illustrated in FIG. 4) formed in the piston top via the intermediate passage 12 formed in the cylinder head 36. The intermediate passage 12 is bored like a cylinder having constant diameter, and the upper end thereof is connected with the lower end of the auxiliary chamber 11 in a manner such that a part of the passage 12 defines a tangential line of the auxiliary chamber wall 13. The air in the main combustion chamber is compressed into the auxiliary combustion chamber 11 at the compression stroke of the piston (not shown) and becomes a swirl flowing along the wall 13 of the auxiliary chamber 11. Like the conventional arrangement, primary combustion takes place in the auxiliary combustion chamber 11, and the flame built therein proceeds to the main combustion chamber, thereby causing secondary combustion.

As described above, the auxiliary chamber 12 is not a true sphere. Specifically, the radius l of the auxiliary chamber 11, i.e., the distance from the auxiliary chamber center O to the auxiliary chamber wall 13, is gradually reduced from point A in the direction the air flows as indicated by the arrow B. Point A is a tangent point at which the auxiliary combustion chamber 1 and the tangent point at which the auxiliary combustion chamber 11 and the tangential line defined by the passage 12 meet. An imaginary true circle S is drawn in FIG. 1 to facilitate understanding the configuration of the auxiliary chamber 11 which is not a true circle. The substantial swirl passage in the auxiliary chamber 11 is gradually reduced in cross-sectional area R in the swirl direction B. In this embodiment, the angle θ and the distance 10 are negatively proportional to each other, where the angle θ represents an angle between the line A-O and the line O-E where E represents an arbitrary point on the chamber wall 13. This negatively proportional relationship can be expressed by the following equation:

$$l = F(\theta) \quad (1)$$
$$= -m \cdot \theta \quad (2)$$

where m represents a proportional constant and the dimension of the central angle θ is in radius.

Therefore, the following relationship is seen from FIG. 1 as the auxiliary chamber 13 is viewed in vertical section:

$$d < a < b < c$$

where d represents the distance from the swirl chamber center O to the swirl chamber end F in the swirl direction B (equal to the radius of the basic circle S), a represents the distance from the center O to the chamber wall 13 upstream of the chamber end F by 90 degrees in the swirl direction, b represents the distance from the center O to the chamber wall 13 upstream of a by 90 degrees, and c represents the distance from the center O to the chamber wall 13 upstream of b by 90 degrees.

Figure 2:
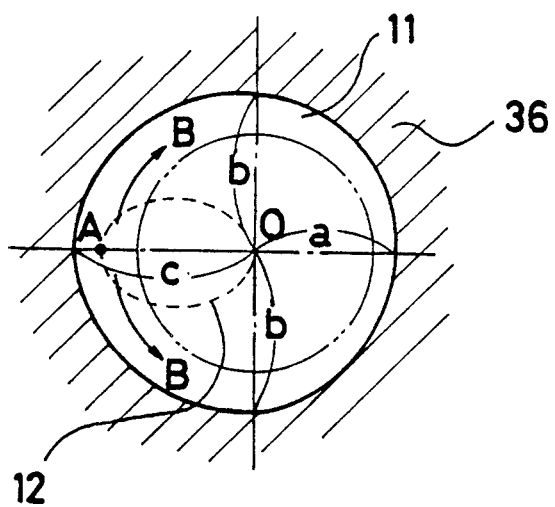
FIG. 2 is a view taken along the line II—II of FIG. 1.

Also, the above relationship is seen in the horizontal section of the auxiliary chamber 11 as shown in FIG. 2. In this case, however, the swirl B branches from the start point A toward either side of the chamber 11 (up and down in the drawing). Thus, there is no d, and the distance a is the shortest one at the downstream end in this particular sectional view.

As mentioned above, the area of the substantial swirl passage, R, in the auxiliary combustion chamber 11 is gradually reduced in the swirl direction B so that the swirl is accelerated as it proceeds downstream, whereby a strong swirl occurs which is stronger than the swirl in a conventional swirl chamber.

In this manner, since the faster swirl is generated, the desired primary combustion can be expected, which results in better output performance and fuel economy of the engine as well as less smoke.

In an actual design of the auxiliary combustion chamber, a casing of a fluid apparatus, such as a centrifugal pump or a Francis turbine, may be used as the swirl chamber 11. Also, the inversely proportional relationship between the central angle θ and the distance l is not strictly required, i.e., a relationship similar to the negatively proportional relationship is satisfactory.

Figure 3:
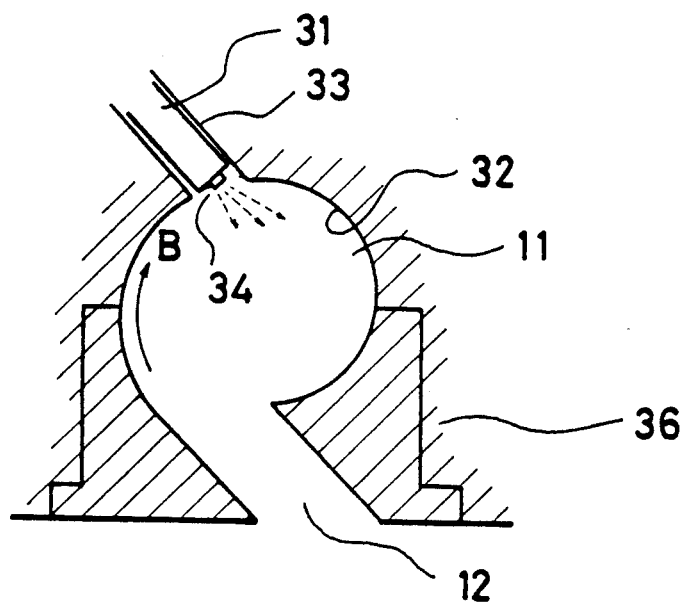
FIG. 3 is a view showing the same swirl chamber as FIG. 1 with a fuel nozzle being disposed in the cylinder head.

Now referring to FIG. 3, a fuel nozzle 31 is disposed in the cylinder head 36 with its injector 34 being exposed in the auxiliary combustion chamber 11 near the top of the auxiliary chamber 11. The nozzle 31 sprays the fuel in the downstream direction of the swirl B. In other words, the injector 34 of the nozzle 31 is directed toward the wall 32 downstream of itself so that the sprayed fuel expands with the swirl B, thereby forming a layer of vaporized fuel as it receives heat from the chamber wall and air compressed by the piston. In this manner, the fuel and air are mixed well with each other due to the strong swirl. Therefore, ignition and combustion characteristics are both improved. In other words, a relatively rapid combustion takes place, thereby improving the engine output performance and fuel economy while reducing smoke.

When a pintaux nozzle having an auxiliary hole which sprays fuel prior to a main hole is employed as the nozzle 31, the auxiliary hole is preferably directed to the chamber wall downstream of itself with respect to the swirl direction B so that the sprayed fuel expands with the swirl, and then the fuel is vaporized due to the heat from the chamber wall and from the compressed air. On the other hand, the main hole of the nozzle is preferably directed to the wall upstream of the line connecting itself to the auxiliary chamber center with respect to the swirl direction B.

When a pintaux nozzle other than the above-mentioned one is employed, the bore 33 for accommodating the nozzle 31 is formed near the chamber top as illustrated in FIG. 3, but unlike the illustration, the nozzle is disposed deep in the bore 33, i.e., the fuel injector 34 is not exposed in the chamber 11 but entirely located in the bore 33, and the fuel injector 34 is directed to the bore wall rather than the chamber wall 32. In this case, therefore, the fuel sprayed from the injector 34 impinges on the bore wall and becomes a fuel spray made up of smaller particles, which facilitates the fuel ignition.

What is claimed is:

1. A combustion chamber for an internal combustion engine, comprising:
    a piston having a main combustion chamber formed in the top thereof;
    an auxiliary combustion chamber formed in the cylinder head of said engine and within which air may swirl; and,
    passage in said cylinder head connecting said main combustion chamber with said auxiliary combustion chamber and directing air from said main combustion chamber into said auxiliary combustion chamber during the compression stroke of said piston,
    said auxiliary chamber having a wall defining a generally spherical cavity communicating with one end of said passage, the distance between the center of said cavity and said wall being reduced from said one side of said passage in the direction of air swirl within said auxiliary combustion chamber all the way around said auxiliary combustion chamber to the area at which said auxiliary combustion chamber meets the opposite side of said passage.

2. A combustion chamber according to claim 1, wherein said distance is a function of an angle defined by a line connecting said one end of said passage with said center and a line connecting said auxiliary combustion chamber center with an arbitrary point on said wall.

3. A combustion chamber according to claim 2, wherein said distance bears a negatively proportional relationship to said angle.

4. A combustion chamber according to claim 1, wherein said spherical cavity includes a reference circle contained therein, the center of said reference circle being coincident with said center of said spherical cavity.

5. A combustion chamber according to claim 2, wherein said spherical cavity includes a reference circle contained therein, the center of said reference circle being coincident with the center of said spherical cavity.

6. A combustion chamber according to claim 3, wherein said spherical cavity includes a reference circle contained therein, the center of said reference circle being coincident with the center of said spherical cavity.

7. A combustion chamber according to claim 1, wherein said passage is cylindrical and possesses a constant cross-section throughout its length.

8. A combustion chamber according to claim 2, wherein said passage is cylindrical and possesses a constant cross-section throughout its length.

9. A combustion chamber according to claim 3, wherein said passage is cylindrical and possesses a constant cross-section throughout its length.

10. A combustion chamber according to claim 4, wherein said passage is cylindrical and possesses a constant cross-section throughout its length.

11. A combustion chamber according to claim 7, wherein at least a part of said passage defines a line tangent to said wall so that air in said main combustion chamber smoothly leaves said passage and enters said cavity during the compression stroke of said piston.

12. A combustion chamber according to claim 8, wherein at least a pair of said passage defines a line tangent to said wall so that air in said main combustion chamber smoothly leaves said passage and enters said cavity during the compression stroke of said piston.

13. A combustion chamber according to claim 9, wherein at least a part of said passage defines a line tangent to said wall so that air in said main combustion chamber smoothly leaves said passage and enters said cavity during the compressions stroke of said piston.

14. A combustion chamber according to claim 11, wherein at least a part of said passage defines a line tangent to said wall so that air in said main combustion chamber smoothly leaves said passage and enters said cavity during the compressions stroke of said piston.

15. A combustion chamber according to claim 11, wherein said one end of said passage includes the tangent point of said tangent line.

16. A combustion chamber according to claim 12, wherein said one end of said passage includes the tangent point of said tangent line.

17. A combustion chamber according to claim 13, wherein said one end of said passage includes the tangent point of said tangent line.

18. A combustion chamber according to claim 14, wherein said one end of said passage includes the tangent point of said tangent line.

19. A combustion chamber according to claim 1, including a fuel nozzle disposed in said cylinder head for spraying fuel toward said wall and in the direction of swirl of air in said auxiliary combustion chamber.

20. A combustion chamber according to claim 2, including a fuel nozzle disposed in said cylinder head for spraying fuel toward said wall and in the direction of swirl of air in said auxiliary combustion chamber.

* * * * *

UNITED STATES PATENT AND TRADEMARK OFFICE
CERTIFICATE OF CORRECTION

PATENT NO. : 4,995,360

DATED : February 26, 1991

INVENTOR(S) : Toshiaki Adachi

It is certified that error appears in the above-identified patent and that said Letters Patent is hereby corrected as shown below:

Column 5, line 32, change "pair" to --part--.

Column 6, line 8, change "11" to --10--.

Signed and Sealed this

Twenty-sixth Day of January, 1993

Attest:

STEPHEN G. KUNIN

*Attesting Officer*      Acting Commissioner of Patents and Trademarks